United States Patent
Rosten et al.

(10) Patent No.: US 11,719,052 B2
(45) Date of Patent: Aug. 8, 2023

(54) FLEXIBLE COUPLING FOR DOWNHOLE DRIVE STRING

(71) Applicant: Tier 1 Energy Tech, Inc., Edmonton (CA)

(72) Inventors: Douglas Rosten, Grande Prairie (CA); Derek Kitchen, Elmworth (CA); Jeffrey Golinowski, Sherwood Park (CA); Trevor Rosten, Grande Prairie (CA); Cody Brown, Grande Prairie (CA)

(73) Assignee: TIER 1 ENERGY SOLUTIONS, INC., Edmonton (CA)

( * ) Notice: Subject to any disclaimer, the term of this patent is extended or adjusted under 35 U.S.C. 154(b) by 0 days.

(21) Appl. No.: 16/267,514

(22) Filed: Feb. 5, 2019

(65) Prior Publication Data

US 2019/0249500 A1    Aug. 15, 2019

Related U.S. Application Data

(60) Provisional application No. 62/631,123, filed on Feb. 15, 2018.

(51) Int. Cl.
*E21B 17/042* (2006.01)
*E21B 17/20* (2006.01)
(Continued)

(52) U.S. Cl.
CPC ............ *E21B 17/042* (2013.01); *E21B 17/05* (2013.01); *E21B 17/20* (2013.01); *E21B 19/16* (2013.01); *F16L 27/02* (2013.01)

(58) Field of Classification Search
CPC .......... E21B 17/20; E21B 17/05; F16L 27/02
See application file for complete search history.

(56) References Cited

U.S. PATENT DOCUMENTS

| 855,106 A | 5/1907 | Hensel |
| 1,732,354 A * | 10/1929 | Cooper ................. F16D 3/2052 |
| | | 464/153 |

(Continued)

FOREIGN PATENT DOCUMENTS

| WO | 2011004183 A2 | 1/2011 |
| WO | 2012023043 A2 | 2/2012 |

(Continued)

*Primary Examiner* — Theodore N Yao
(74) *Attorney, Agent, or Firm* — Bennett Jones LLP

(57) ABSTRACT

A flexible coupling for coupling sections of a downhole tubing string is provided. The flexible coupling has a central section with first and second ends, each end having a contact surface and a first part of a pivoting connector, the contact surface extending radially outward relative to the first part of the pivoting connector. The flexible coupling also has first and second coupling sections pivotally coupled to the first and second ends of the central section. Each of the first and second coupling sections have a tubing string attachment at a first end, a second part of the pivoting connector at a second end, and a contact surface at the second end, the contact surface extending radially outward relative to the second part of the pivoting connector. Pivotal movement of the first and second coupling sections relative to the central section is limited by engagement between the contact surfaces.

8 Claims, 7 Drawing Sheets

(51) Int. Cl.
*E21B 19/16* (2006.01)
*E21B 17/05* (2006.01)
*F16L 27/02* (2006.01)

(56) References Cited

U.S. PATENT DOCUMENTS

| | | | |
|---|---|---|---|
| 2,990,895 A | | 7/1961 | Works et al. |
| 3,446,301 A | | 5/1969 | Thomas |
| 3,603,110 A | | 9/1971 | Fredd |
| 4,772,246 A | * | 9/1988 | Wenzel ............... E21B 4/02 464/117 |
| 4,904,228 A | * | 2/1990 | Frear ............... E21B 17/05 464/152 |
| 4,982,801 A | * | 1/1991 | Zitka ............... E21B 4/02 173/218 |
| 4,982,901 A | | 1/1991 | Zitka et al. |
| 5,311,952 A | | 5/1994 | Eddison et al. |
| 5,547,032 A | * | 8/1996 | Wenzel ............... E21B 7/068 175/317 |
| 5,617,926 A | | 4/1997 | Eddison et al. |
| 5,651,737 A | | 7/1997 | Le Blanc |
| 5,664,891 A | | 9/1997 | Kutinsky et al. |
| 5,704,838 A | | 1/1998 | Teale |
| 5,841,734 A | | 11/1998 | Ritter et al. |
| 5,860,864 A | * | 1/1999 | Vukovic ............... E21B 17/05 464/147 |
| 7,004,843 B1 | | 2/2006 | Kerstetter |
| 8,291,973 B2 | | 10/2012 | Johnson et al. |
| 8,870,666 B1 | | 10/2014 | Leger et al. |
| 9,453,376 B1 | * | 9/2016 | Raymond ............... E21B 17/20 |
| 9,534,638 B2 | * | 1/2017 | Marchand ............... E21B 4/02 |
| 2003/0181245 A1 | | 9/2003 | Shaw |
| 2011/0308858 A1 | | 12/2011 | Menger et al. |
| 2014/0311757 A1 | | 10/2014 | Hallundbæk et al. |
| 2016/0108970 A1 | * | 4/2016 | Baudoin ............... E21B 7/068 464/15 |
| 2016/0258288 A1 | | 9/2016 | Hay et al. |
| 2017/0002871 A1 | | 1/2017 | McMillan et al. |
| 2017/0081928 A1 | | 3/2017 | Maw et al. |
| 2017/0138140 A1 | | 5/2017 | Sheiretov et al. |
| 2017/0370420 A1 | * | 12/2017 | Deen ............... F16D 3/72 |

FOREIGN PATENT DOCUMENTS

| | | |
|---|---|---|
| WO | 2013090063 A1 | 6/2013 |
| WO | 2014039078 A1 | 3/2014 |
| WO | 2015099770 A1 | 7/2015 |
| WO | 2015117151 A2 | 8/2015 |
| WO | 2016057453 A1 | 4/2016 |

* cited by examiner

FLEXIBLE COUPLING FOR DOWNHOLE DRIVE STRING

TECHNICAL FIELD

This relates to coupling devices for downhole drive strings, and in particular, to flexible couplings for downhole drive strings.

BACKGROUND

When drilling hydrocarbon wells, it is often required to drill at different angles, and to enable the drive string to bend. In order to accommodate the bending of drive strings, flexible couplings are provided. U.S. Pat. No. 4,982,801 (Zitka et al.) entitled FLEXIBLE COUPLING FOR DOWNHOLE MOTOR teaches a flexible coupling using two flexible joints and ball bearing. U.S. Pat. No. 7,004,843 (Kerstetter) entitled FLEXIBLE UNIVERSAL JOINT SUB CONNECTION FOR DOWN HOLE MUD MOTOR METHOD AND APPARATUS teaches another type of flexible joint having a post and contact surfaces.

SUMMARY

According to an aspect, there is provided a flexible coupling for coupling sections of a downhole tubing string, the flexible coupling comprising a central section comprising a first end and a second end spaced axially from the first end, each of the first end and the second end comprising a contact surface and a first part of a pivoting connector, the contact surface extending radially outward relative to the first part of the pivoting connector, and a first coupling section pivotally coupled to the first end of the central section and a second coupling section pivotally coupled to the second end of the central section, each of the first coupling section and the second coupling section comprising a tubing string attachment at a first end, a second part of the pivoting connector at a second end that pivotally connects to the first part of the pivoting connector, and a contact surface at the second end, the contact surface extending radially outward relative to the second part of the pivoting connector, wherein pivotal movement of the first and second coupling sections relative to the central section is limited by the contact surfaces of the first and second coupling sections engaging the contact surfaces of the central section.

According to another aspect, the first and second connectors may comprise threaded shafts at the first end and balls at the second end, and the retaining portion of the first and second coupling sections may be shaped to receive the balls of the connectors.

According to another aspect, the contact surfaces of the coupling sections may be angled to determine the degree of bending of the flexible coupling.

According to another aspect, the central section may comprise a central bore, and the first parts of the pivoting connectors may each have a first end received within the central bore of the central section and a second end extending outwards from the central block.

According to another aspect, the flexible coupling may further comprise a fluid passage that communicates fluid between the first coupling section and the second coupling section.

According to another aspect, each of the first and second coupling sections may pivot within a range of at least 10 degrees relative to the central section.

According to another aspect, the pivoting connections may be ball joints.

According to another aspect, the first and second coupling sections may apply a compressive force to the central block in a fully pivoted position.

According to an aspect, there is provided a method of flexing a downhole tubing string, the method comprising the steps of providing a flexible coupling for coupling sections of the downhole tubing string, the flexible coupling comprising a central section comprising a first end and a second end spaced axially from the first end, each of the first end and the second end comprising a contact surface and a first part of a pivoting connector, the contact surface extending radially outward relative to the first part of the pivoting connector, and a first coupling section pivotally coupled to the first end of the central section and a second coupling section pivotally coupled to the second end of the central section, each of the first coupling section and the second coupling section comprising a tubing string attachment at a first end, a second part of the pivoting connector at a second end that pivotally connects to the first part of the pivoting connector, and a contact surface at the second end, the contact surface extending radially outward relative to the second part of the pivoting connector, attaching sections of the downhole tubing string to the tubing string attachments at the first ends of the first coupling section and the second coupling section, pivoting the first and second coupling sections relative to the central section to allow the downhole tubing string to flex around the central section, and engaging the contact surfaces of the first and second coupling sections and the contact surfaces of the central section to limit pivotal movement of the first and second coupling sections relative to the central section.

According to another aspect, the first and second connectors may comprise threaded shafts at the first end and balls at the second end, and the retaining portion of the first and second coupling sections may be shaped to receive the balls of the connectors.

According to another aspect, the contact surfaces of the coupling sections may be angled to determine the degree of bending of the flexible coupling.

According to another aspect, the central section may comprise a central bore, and the first parts of the pivoting connectors may each have a first end received within the central bore of the central section and a second end extending outwards from the central block.

According to another aspect, the flexible coupling may further comprise a fluid passage that communicates fluid between the first coupling section and the second coupling section.

According to another aspect, each of the first and second coupling sections may pivot within a range of at least 10 degrees relative to the central section.

According to another aspect, the pivoting connections may be ball joints.

According to another aspect, the first and second coupling sections may apply a compressive force to the central block in a fully pivoted position.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
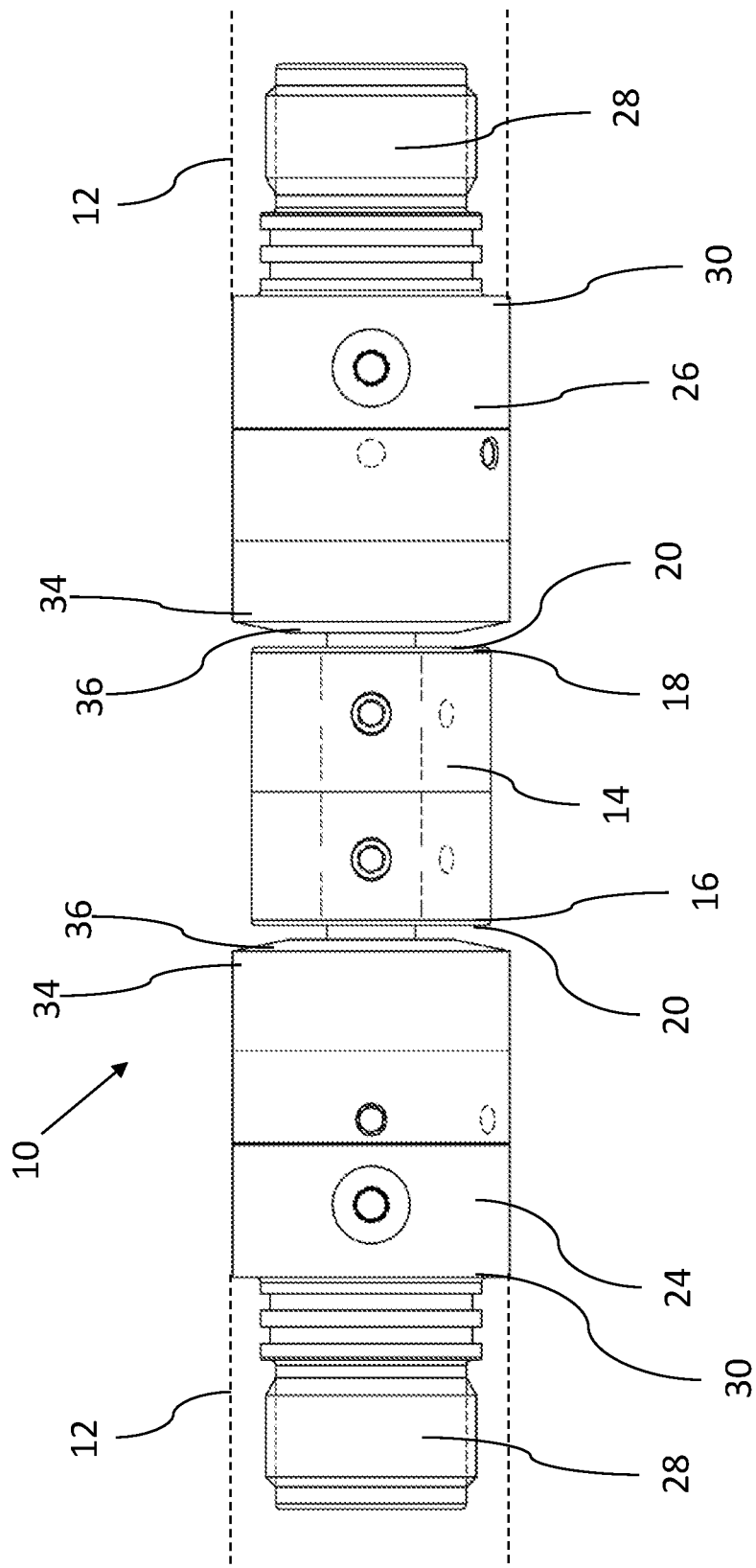
FIG. 1 is a top plan view of a flexible coupling for a downhole drive string in a straight position.

A flexible coupling generally identified by reference numeral 10, will now be described with reference to FIG. 1 through 6.

Figure 6:
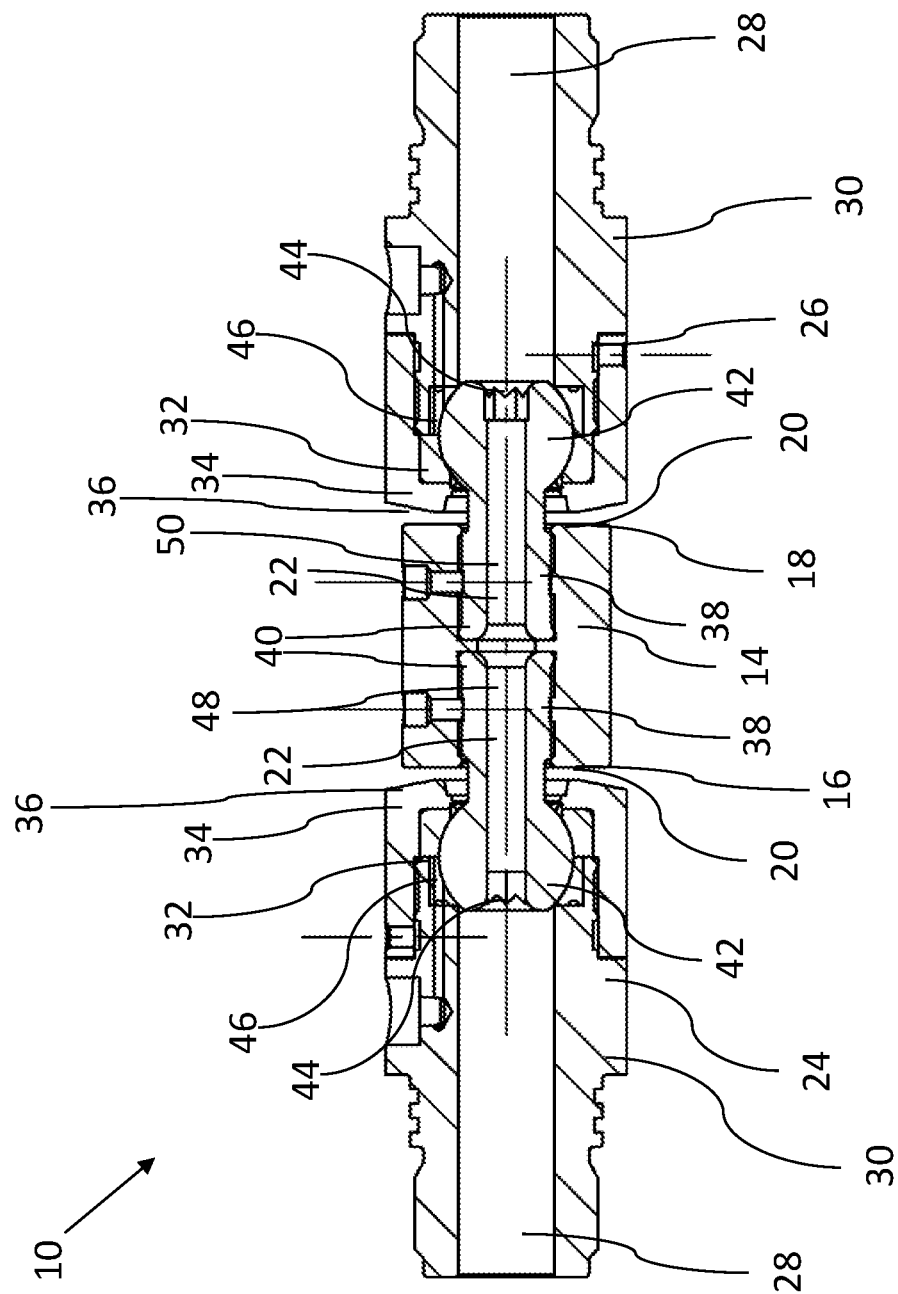
FIG. 6 is a cross-sectional view of a flexible coupling for a downhole drive string in a straight position taken along the line B-B of FIG. 5.

Referring to FIG. 1, flexible coupling 10 is used for coupling sections of a downhole tubing string 12. Flexible coupling 10 has a central section 14 with a first end 16 and a second end 18 spaced axially from first end 16. First end 16 and second end 18 each have a contact surface 20. Referring to FIG. 6, each of first end 16 and second end 18 have a first part of a pivoting connector 22, and contact surface 20 extends radially outward relative to first part of a pivoting connector 22. It will be understood that while contact surface 20 is shown perpendicular in the depicted example, it may also extend at an angle as the term "radially outward" in this context is used to describe contact surface 20 extending away from pivoting connector 22, and does not require that contact surface 20 extend solely perpendicularly relative to pivoting connector 22. As will be understood, a range of angles of contact surface 20 may be used, both away from and toward central section 14, and depending on the application and preferences of the user.

Figure 4:
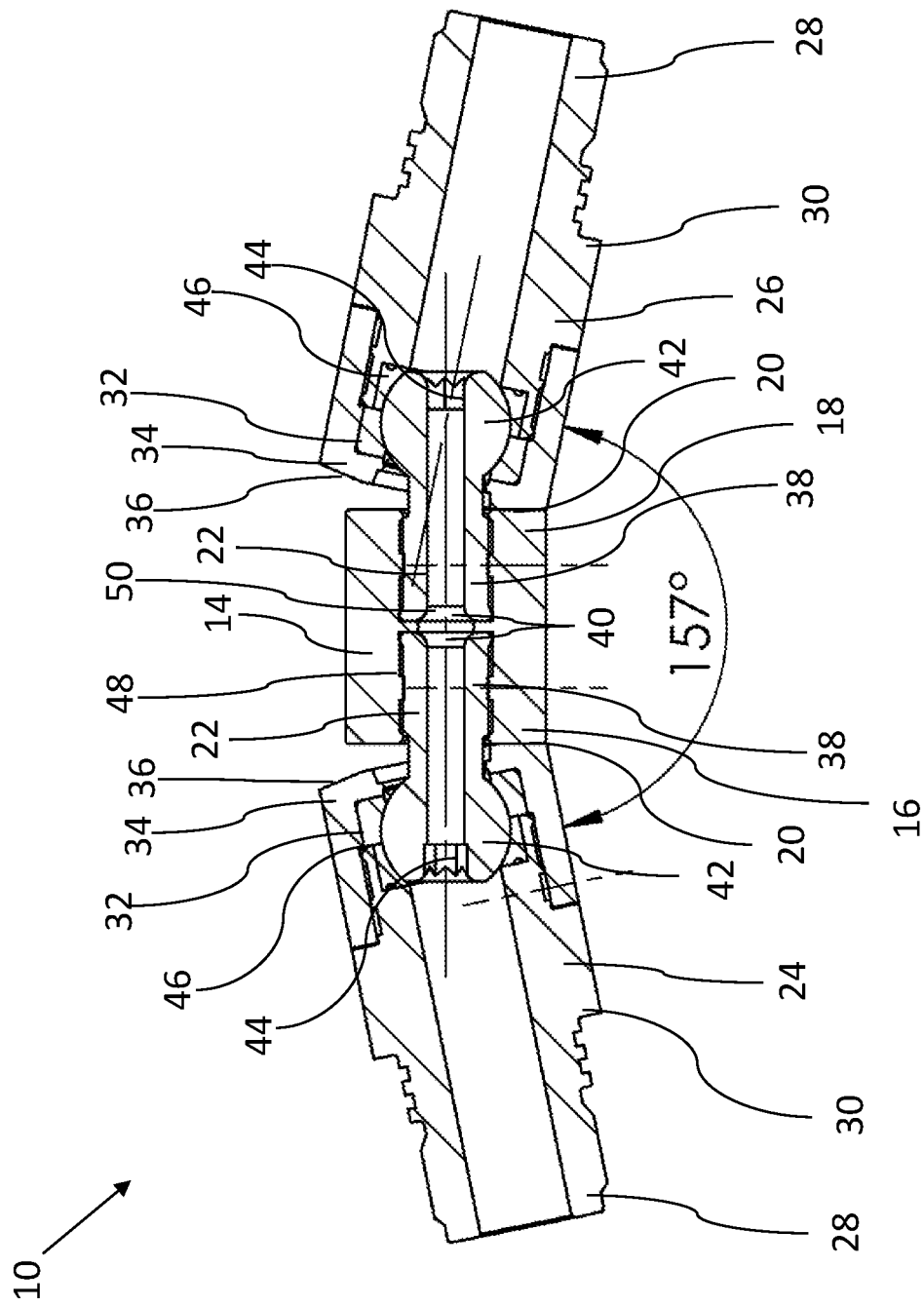
FIG. 4 is a cross-sectional view of a flexible coupling for a downhole drive string in a bent position taken along the line A-A of FIG. 3.
Figure 5:
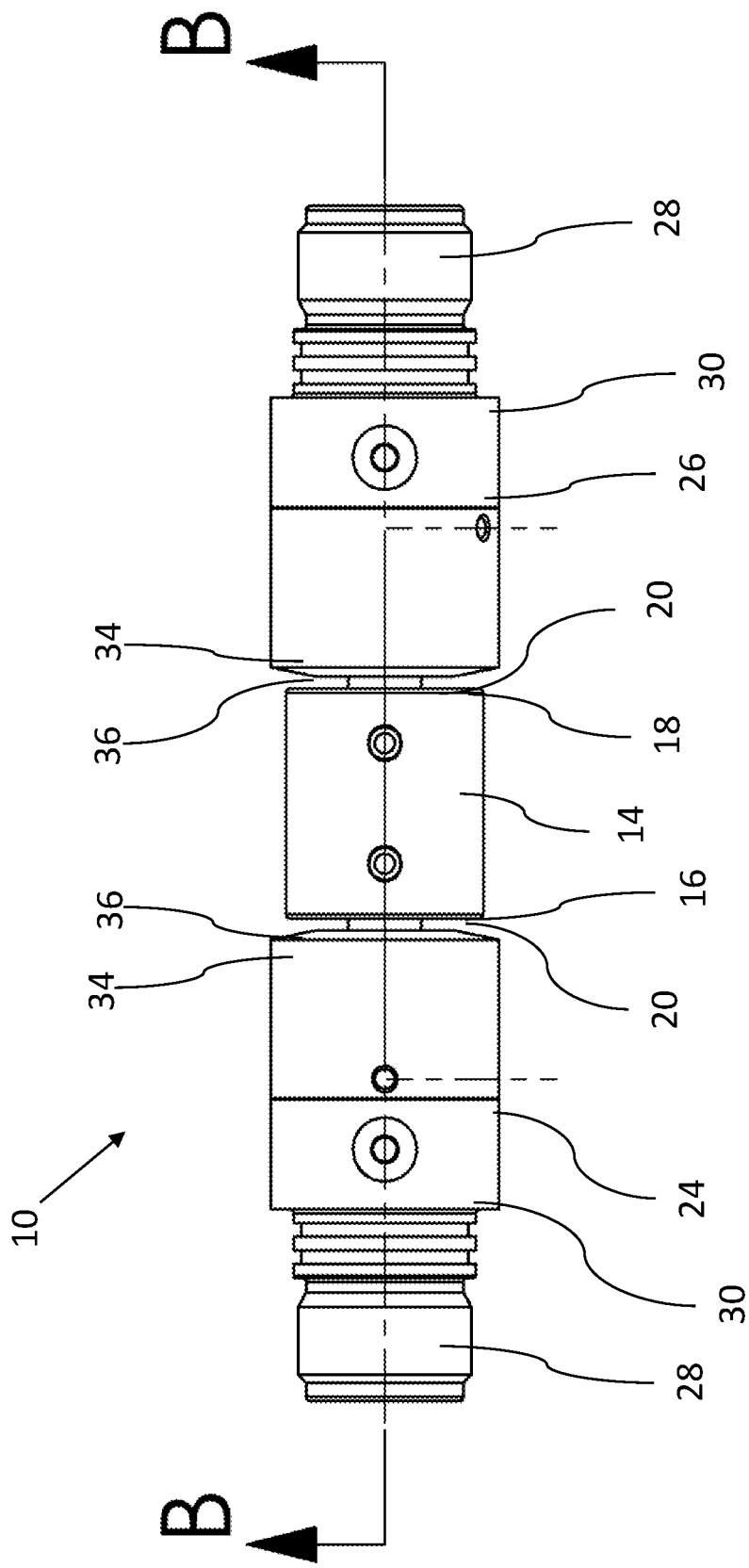
FIG. 5 is a top plan view of a flexible coupling for a downhole drive string in a straight position.

Referring to FIG. 5, flexible coupling 10 has a first coupling section 24 pivotally coupled to first end 16 of central section 14 and a second coupling section 26 pivotally coupled to second end 18 of central section 14. Each of first coupling section 24 and second coupling section 26 have a tubing string attachment 28 at a first end 30. Tubing string attachment 28 may take a variety of forms as are common in the art. Referring to FIG. 6, first and second coupling sections 24 and 26 also have a second part of a pivoting connector 32 at a second end 34 that pivotally connects to first part 22 to form a pivoting connection. First and second coupling sections 24 and 26 each have a contact surface 36 at second end 34, where contact surface 36 extending radially outward relative to second part of a pivoting connector 32. As discussed above with respect to contact surface 20, contact surface 36 may extend at an angle, although contact surfaces 20 and 36 are preferably designed to engage along their radial dimension when flexible coupling 10 is fully flexed to avoid point loads being applied. Referring to FIG. 4, pivotal movement of first coupling section 24 and second coupling section 26 relative to central section 14 is limited by the contact surfaces 36 of first and second coupling sections 24 and 26 engaging the contact surfaces 20 of central section 14. When fully flexed, or when flexible coupling 10 is in a fully pivoted position, first and second coupling sections 24 and 26 apply a compressive force to the portion of central block 14 directly between the points of contact, while central block 14 is placed in tension along an axis between pivoting connectors 32. The contact surfaces 36 of the first and second coupling sections 24 and 26, and the contact surfaces 20 of the central section 14 can be at a variety of angles in order to determine the amount to which flexible coupling 10 is able to flex. For example, each of first and second coupling sections 24 and 26 may be able to pivot within a range of at least 10 degrees relative to central section 14.

Figure 7:
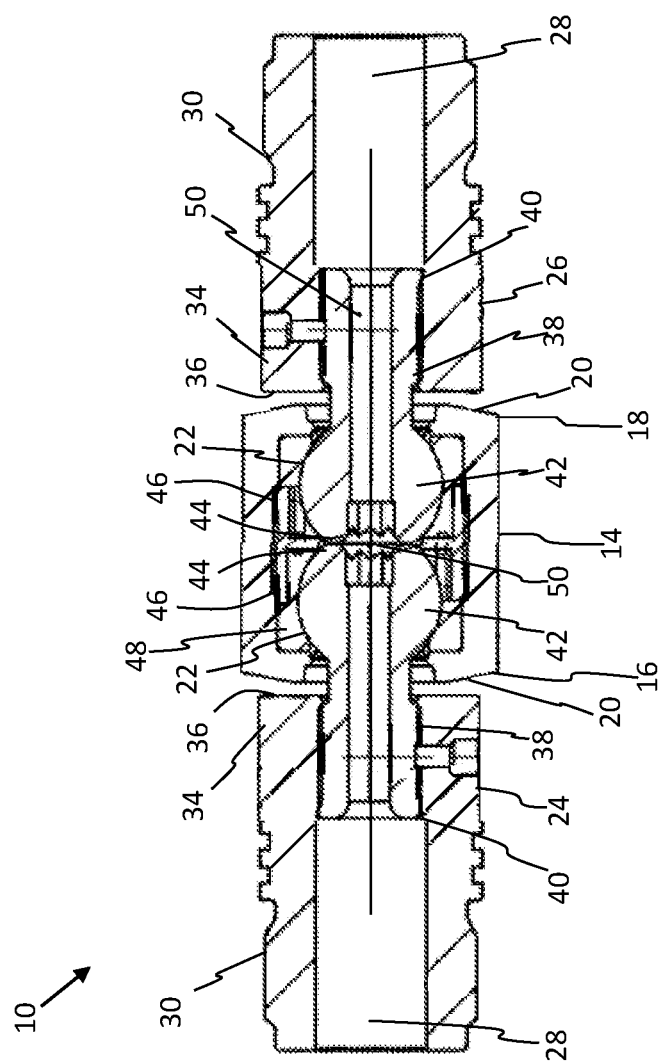
FIG. 7 is a cross-sectional view of another embodiment of a flexible coupling for a downhole drive string in a straight position.

In the example shown in FIG. 4, first parts of a pivoting connector 22 are made up of threaded shafts 38 at a first end 40 and balls 42 at a second end 44. The second part of a pivoting connector 32 is a retaining portion 46 that is shaped to receive the balls 42 of the first parts 22. It will be understood that the connection may be reversed such that the first and second coupling sections 24 carry the shafts 38 and balls 42, and the central section 14 carries the retaining portion 46, as shown in FIG. 7. The pivoting connections formed may be ball joints. It will be understood that the ball in the ball joint need not be a full ball, and may be a portion of a ball, or semi-spherical, for example. A central bore 48 may also be provided through central section 14 and the first parts of a pivoting connector 22 may each have their first end 40 received within central bore 48 of central section 14 and their second end 44 extending outwards from central block 14. As shown in FIG. 6, there may also be a fluid passage 50 that communicates fluid between first coupling section 24 and second coupling section 26.

Figure 2:
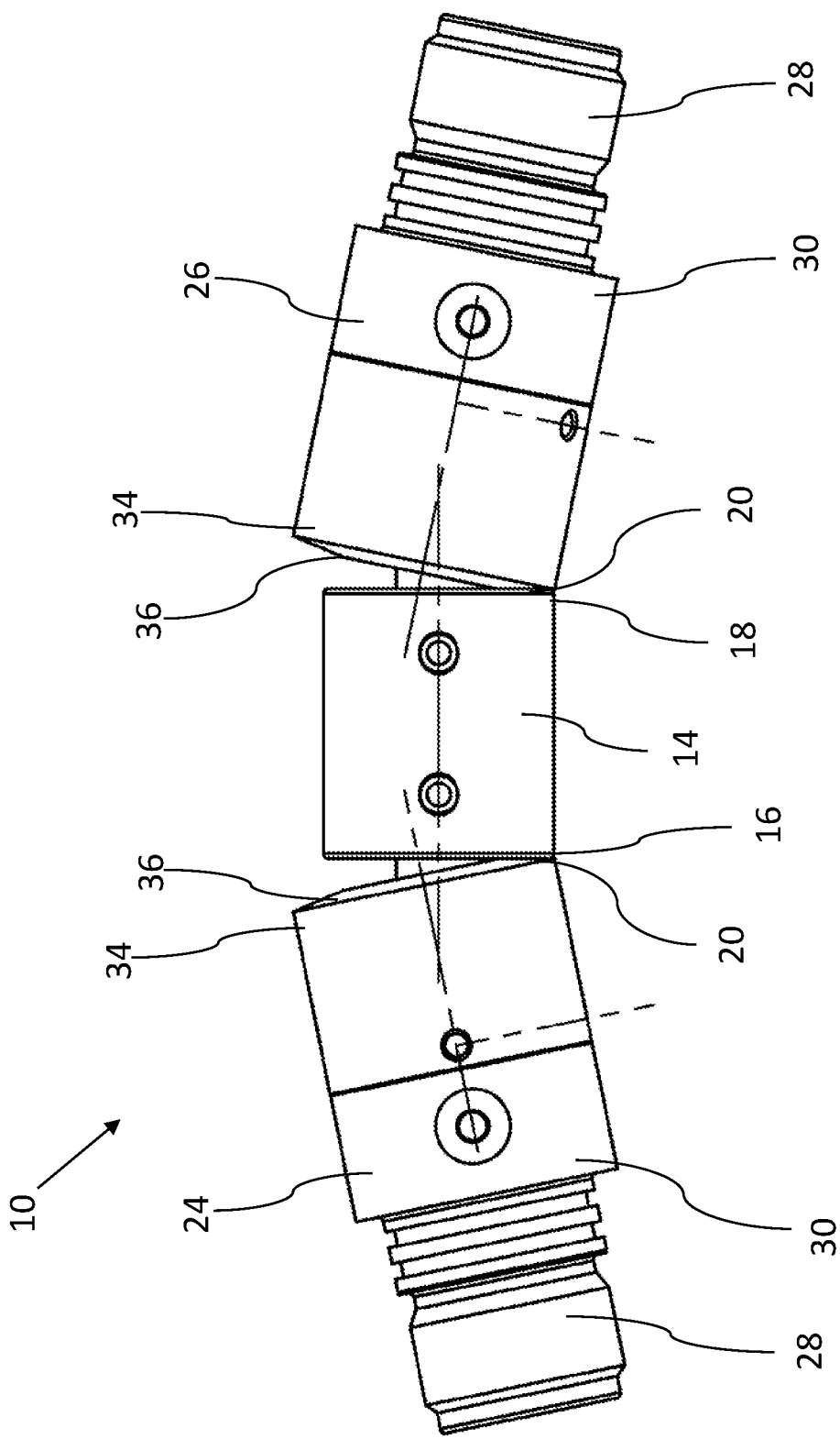
FIG. 2 is a top plan view of a flexible coupling for a downhole drive string in a bent position.
Figure 3:
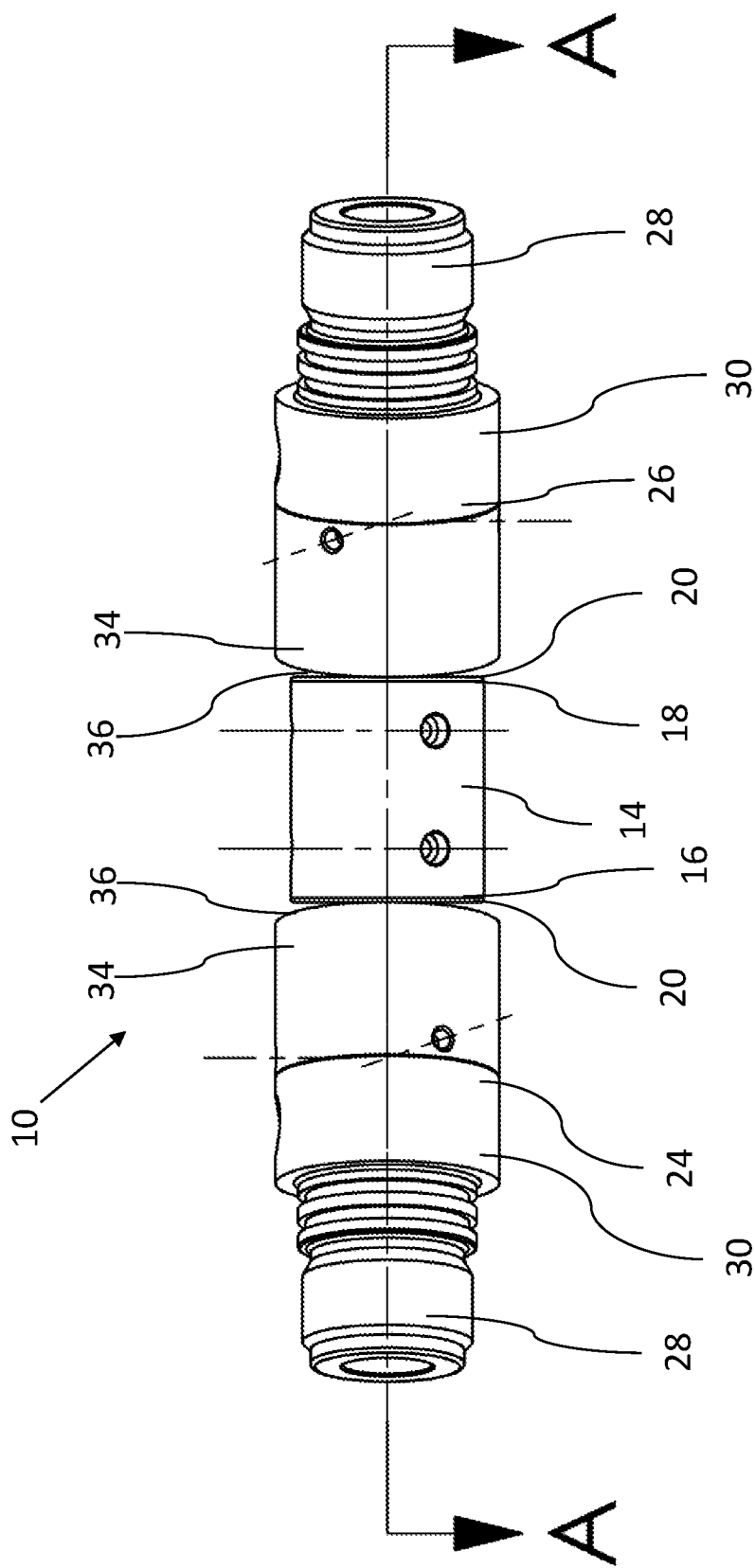
FIG. 3 is a side elevation view of a flexible coupling for a downhole drive string in a bent position.

A method of flexing a downhole tubing string will now be described. Flexible coupling 10 is attached between sections of downhole tubing string 12 at the tubing string attachments 28 of the first and second coupling sections 24 and 26. First and second coupling sections 24 and 26 can then be pivoted around central section 14 to allow tubing string 12 to flex. Referring to FIG. 2 and FIG. 3, when contact surfaces 20 of central section 14 and contact surfaces 36 of first and second coupling sections 24 and 26 engage with each other, flexible coupling 10 cannot be flexed any further. The engagement between contact surfaces 20 and 36 limits pivotal movement of first and second coupling sections 24 and 26 relative to central section 14. Referring to FIG. 4, by providing central block 14 and creating contact at contact surfaces 20 and 36, the force applied to the shaft 38 in the ball and socket joint between the components 24, 26, and 14, becomes a tension force pulling outwards on shaft 38 rather than a bending point load or shear force applied to shaft 38. The amount to which tension and compression loads are applied to central block 14 and point or shear loads are reduced, the permissible range of movement may be reduced by the relative position and angle of contact faces 20 and 36. As shown in FIG. 4, the two ends of shaft 38 may be separated, allowing for the forces applied on one side of the connection to be separate from the forces applied on the other side of the connection. It will be understood that shaft 38 may also be a single piece passing through central block 14, such that a tension force may be applied from both sides. Providing central block 14 to limit bending of the connection may reduce the strain on shaft 38 and reduce the risk of failure of flexible coupling 10. This may also allow for shaft 38 to be placed in tension rather than being bent by the forces involved. It will also be understood that while one flexible coupling 10 is shown in the drawings, multiple flexible couplings 10 may be used along the length of downhole tubing string 12 to allow for a desired degree of flexibility. As an example, if each flexible coupling 10 is capable of bending 22.5 degrees, two flexible couplings 10 may be provided to permit downhole tubing string 12 to bend at a 45 degrees.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A flexible coupling for coupling sections of a downhole tubing string, comprising:
   (a) first and second coupling sections, each comprising a tubing string attachment at a first end and a contact surface at a second end;
   (b) a central section having a proximal end facing the first coupling section and a distal end facing the second coupling section; and
   (c) a first pivoting connector rigidly attached to one of the first coupling section or the central section and pivotally attached to the other;
   (d) a second pivoting connector rigidly attached to one of the second coupling section or the central section and pivotally attached to the other;
   wherein the flexible coupling is moveable between an axially aligned position where the first and second pivoting connectors maintain separation between the first and second coupling section contact surfaces and the central section, and a pivoted position wherein one or both of the first and second coupling section contact surfaces is in direct physical contact with the central section to limit pivotal movement of the first and second coupling sections, respectively, relative to the central section; and
   wherein the flexible coupling defines a bore passing through the first and second coupling sections, the central section and the first and second pivoting connectors, providing fluid communication through the flexible coupling, wherein the bore is open at the first and second coupling section first ends for fluid communication from the bore into the sections of the downhole tubing string when coupled to the first and second coupling section first ends, and
   wherein the portion of the bore passing through the first and second coupling sections has a larger cross-sectional area along its entire length than the portion of the bore passing through the first and second pivoting connectors.

2. The flexible coupling of claim 1, wherein the pivoted position is where both the first and second coupling section contact surfaces are in direct physical contact with the central section.

3. The flexible coupling of claim 2, wherein the first and second coupling sections apply a compressive force to the central section in the pivoted position.

4. The flexible coupling of claim 1 wherein the pivoted position is one where one or both of the first and second coupling sections is capable of being pivoted 22.5 degrees relative to the central section.

5. The flexible coupling of claim 1 wherein the second coupling section contact surface is at a non-perpendicular angle to a longitudinal axis of the second coupling section.

6. The flexible coupling of claim 1, wherein the first coupling section contact surface is not perpendicular to a longitudinal axis of the first coupling section.

7. The flexible coupling of claim 1, wherein one or both of the pivoting connectors are ball joints.

8. The flexible coupling of claim 1, wherein the ball joint comprises a shaft and a ball, wherein the shaft is rigidly attached to the central section and the ball is disposed in a socket defined by the first or second coupling section.

* * * * *